United States Patent
Simlett et al.

(10) Patent No.: US 12,169,827 B2
(45) Date of Patent: Dec. 17, 2024

(54) APPARATUS AND METHOD FOR ENABLING ASSET SHARING

(71) Applicant: EYGS LLP, London (GB)

(72) Inventors: John Simlett, London (GB); Philipp Wolfgang Schartau, London (GB); Kulraj Singh Smagh, Coventry (GB); Tristram Musa Benson, Cambridge (GB); Michael Stefan Yorke, Cheshire (GB); Samuel Davies, Sawbridgeworth (GB); Stuart Barrass, London (GB)

(73) Assignee: EYGS LLP, London (GB)

( * ) Notice: Subject to any disclaimer, the term of this patent is extended or adjusted under 35 U.S.C. 154(b) by 0 days.

(21) Appl. No.: 16/634,661

(22) PCT Filed: Jul. 27, 2018

(86) PCT No.: PCT/GB2018/052131
§ 371 (c)(1),
(2) Date: Jan. 28, 2020

(87) PCT Pub. No.: WO2019/021019
PCT Pub. Date: Jan. 31, 2019

(65) Prior Publication Data
US 2020/0234286 A1    Jul. 23, 2020

(30) Foreign Application Priority Data
Jul. 28, 2017    (GB) ..................... 1712181

(51) Int. Cl.
*G06Q 20/38* (2012.01)
*G06Q 20/06* (2012.01)
(Continued)

(52) U.S. Cl.
CPC ......... *G06Q 20/382* (2013.01); *G06Q 20/065* (2013.01); *G06Q 20/0855* (2013.01); *G06Q 20/145* (2013.01); *G06Q 20/389* (2013.01)

(58) Field of Classification Search
USPC .......................................... 705/44
See application file for complete search history.

(56) References Cited

U.S. PATENT DOCUMENTS 6,202,056 B1 *  3/2001  Nuttall ................ G06Q 20/40
                                                    705/52
2010/0039247 A1 *  2/2010  Ziegler ................ G07C 3/00
                                                    340/436
(Continued)

FOREIGN PATENT DOCUMENTS

WO    WO-2017142536 A1 *  8/2017  ......... G01C 21/3438

OTHER PUBLICATIONS

Authors: Sheetal Sinha: Implementation of Blockchain in Financial Sector to Improve Scalability; IEEE Conference Paper: Last Update Date: Apr. 17, 2020; Publication Date: Nov. 1, 2019 (Year: 2019).*
(Continued)

*Primary Examiner* — Bruce I Ebersman
*Assistant Examiner* — Hatem M Ali
(74) *Attorney, Agent, or Firm* — Alston & Bird LLP (57) ABSTRACT

A node is provided that is configured to interact with one or more other nodes to implement a distributed authentication protocol. The node is configured to receive data that is indicative of use of a physical asset, generate a usage fee to be assigned to one or more owners of the physical asset in dependence on the use data and record that usage fee in a data corpus authenticated by the distributed authentication protocol.

13 Claims, 4 Drawing Sheets

(51) Int. Cl.
  *G06Q 20/08* (2012.01)
  *G06Q 20/14* (2012.01)

(56) References Cited

U.S. PATENT DOCUMENTS

| | | | | |
|---|---|---|---|---|
| 2010/0161392 | A1* | 6/2010 | Ashby | G06Q 50/40 |
| | | | | 705/13 |
| 2016/0189435 | A1* | 6/2016 | Beaurepaire | G08G 1/202 |
| | | | | 705/13 |
| 2017/0046669 | A1* | 2/2017 | Chow | G06Q 10/0631 |
| 2018/0089596 | A1* | 3/2018 | Hirose | G01C 21/3476 |
| 2019/0356481 | A1* | 11/2019 | Spector | G06Q 20/3674 |
| 2020/0374113 | A1* | 11/2020 | Noam | G06F 21/64 |
| 2021/0314313 | A1* | 10/2021 | Uhr | H04L 9/0637 |

OTHER PUBLICATIONS

Authors: Fei Richard Yu et al: Virtualization for Distributed Ledger Technology (vDLT); IEEE Periodical Publication: Publication Date: Jan. 1, 2018; Print Publication Date: Apr. 20, 2018 Electronic Publication Date: May 23, 2018 (Year: 2018).*

1. Authors: Amirsaman Mahdavian et al; Title: Drivers and Barriers to Implementation of Connected, Automated, Shared, and Electric Vehicles: An Agenda for Future Research; IEEEXPLORE; Publication Date: Jan. 1, 2021; Print Publication Date: Jan. 29, 2021 (Year: 2021).*

2. Authors: Felix Funk et al; Title: Increasing charging station availability through peer-to-peer reservation markets; IEEE XPLORE; Date of Conference: Dec. 7-9, 2021 (Year: 2021).*

1. Authors: Amirsaman Mahdavian et al; Title: Drivers and Barriers to Implementation of Connected, Automated, Shared, and Electric Vehicles: An Agenda for Future Research; Ieeexplore; Publication Date: Jan. 1, 2021; Print Publication Date: Jan. 29, 2021 (Year: 2021) (Year: 2021).*

2. Authors: Felix Funk et al; Title: Increasing charging station availability through peer-to-peer reservation markets; IEEE XPLORE; Date of Conference: Dec. 7-9, 2021 (Year: 2021) (Year: 2021).*

Franco, Pedro, *Understanding Bitcoin: Cryptography, Engineering and Economics*, Wiley, Nov. 24, 2014, pp. ToC, Chapters 01-02, Chapters 05-07, Chapter 12, pp. 183-186, XP055393688, ISBN: 978-1-119-01916-9.

International Searching Authority, International Search Report and Written Opinion for International Application No. PCT/GB2018/052131, Sep. 6, 2018, (10 pages), European Patent Office, Rijswijk, Netherlands.

Christidis, Konstantinos et al. *Blockchains and Smart Contracts For The Internet of Things*, IEEE Access, vol. 4, May 10, 2016, pp. 2292-2303. DOI: 10.1109/Access.2016.2566339.

* cited by examiner

APPARATUS AND METHOD FOR ENABLING ASSET SHARING

CROSS REFERENCE TO RELATED APPLICATIONS

This application is a National Stage Application, filed under 35 U.S.C. § 371, of International Application No. PCT/GB2018/052131, filed Jul. 27, 2018, which international application claims priority to and the benefit of United Kingdom Application No. 1712181.5, filed Jul. 28, 2017; the contents of both of which as are hereby incorporated by reference in their entireties.

BACKGROUND

Related Field

This invention relates to an apparatus and method for enabling multiple users to share an asset.

At present, most automobiles are privately owned and used exclusively by their owners. For much of the time these vehicles are unused. There are some limited opportunities to share the usage of automobiles: for example taxis, car share arrangements and car hire companies. These schemes can increase the proportion of time for which an individual vehicle is used, which can reduce overall costs to the users. It is anticipated that in the future there will be increased demand for shared vehicle usage schemes, especially in urban areas.

Description of Related Art

In order to administer a shared usage scheme, a number of contractual arrangements and physical security protocols need to be put in place. If there are multiple vehicle owners in the scheme then there is a need to maintain a register of who provides each vehicle. There may need to be a way for users to reserve access to vehicles. There needs to be a mechanism for ensuring that vehicles can only be accessed by authorised users, and there needs to be a way to manage payments from users to the provider(s) of the vehicles. In existing vehicle share schemes these issues are either managed by dedicated staff who are associated with a vehicle's provider (as in taxi and conventional car hire schemes), or there is a single vehicle provider who operates a private database through which contractual and physical security aspects are managed (as in current car share schemes). In the future, it may be desirable for to facilitate a different model. In that model, an individual vehicle owner might want to own a vehicle for their private use, but to permit others to use the vehicle for a fee at times when the owner does not need the vehicle for their own use. In this model, there might be no staff to manage the scheme and it would be impractical for an individual owner to operate their own private management database.

BRIEF SUMMARY

According to a first aspect, a node is provided that is configured to interact with one or more other nodes to implement a distributed authentication protocol. The node is configured to receive data that is indicative of use of a physical asset. It is configured to generate a usage fee to be assigned to one or more owners of the physical asset in dependence on the use data. It is also configured to record that usage fee in a data corpus authenticated by the distributed authentication protocol.

Other aspects may include one or more of the following:

There may be multiple owners of the physical asset. The node may be configured to record the usage fee in the data corpus such that the usage fee is divided between those multiple owners. The node may be configured to cause the usage fee to be divided between the multiple owners in proportion to a division of ownership of the physical asset between those owners.

The node may be configured to receive the use data from one or more sensors that are attached to the physical asset. The node may be configured to generate the usage fee in dependence on a physical effect that the use data indicates the use has had on the physical asset. The node may be configured to generate the usage fee in dependence on damage that the use data indicates the use may have inflicted on the physical asset. The node may be configured to trigger maintenance of the asset in dependence on the use data. The node may be configured to generate the usage fee by inputting the use data into a smart contract. The smart contract may define who can use the asset and/or how the asset may be used.

The node may be configured to receive use data that is indicative of use of the asset by a non-owner of the asset. The node may be configured to receive use data that is indicative of use of the asset by an owner of the asset. The node may be configured to generate the usage fee in a cryptocurrency. The distributed authentication protocol may be a blockchain protocol.

According to a second aspect, a method is provided that comprises a node interacting with one or more other nodes to implement a distributed authentication protocol. The method comprises the node receiving data that is indicative of use of a physical asset. It comprises the node generating a usage fee to be assigned to one or more owners of the physical asset in dependence on the use data. It also comprises the node recording that usage fee in the distributed ledger.

BRIEF DESCRIPTION OF THE FIGURES

The present invention will now be described by way of example with reference to the accompanying drawings. In the drawings.

DETAILED DESCRIPTION OF VARIOUS EMBODIMENTS

Figure 1:
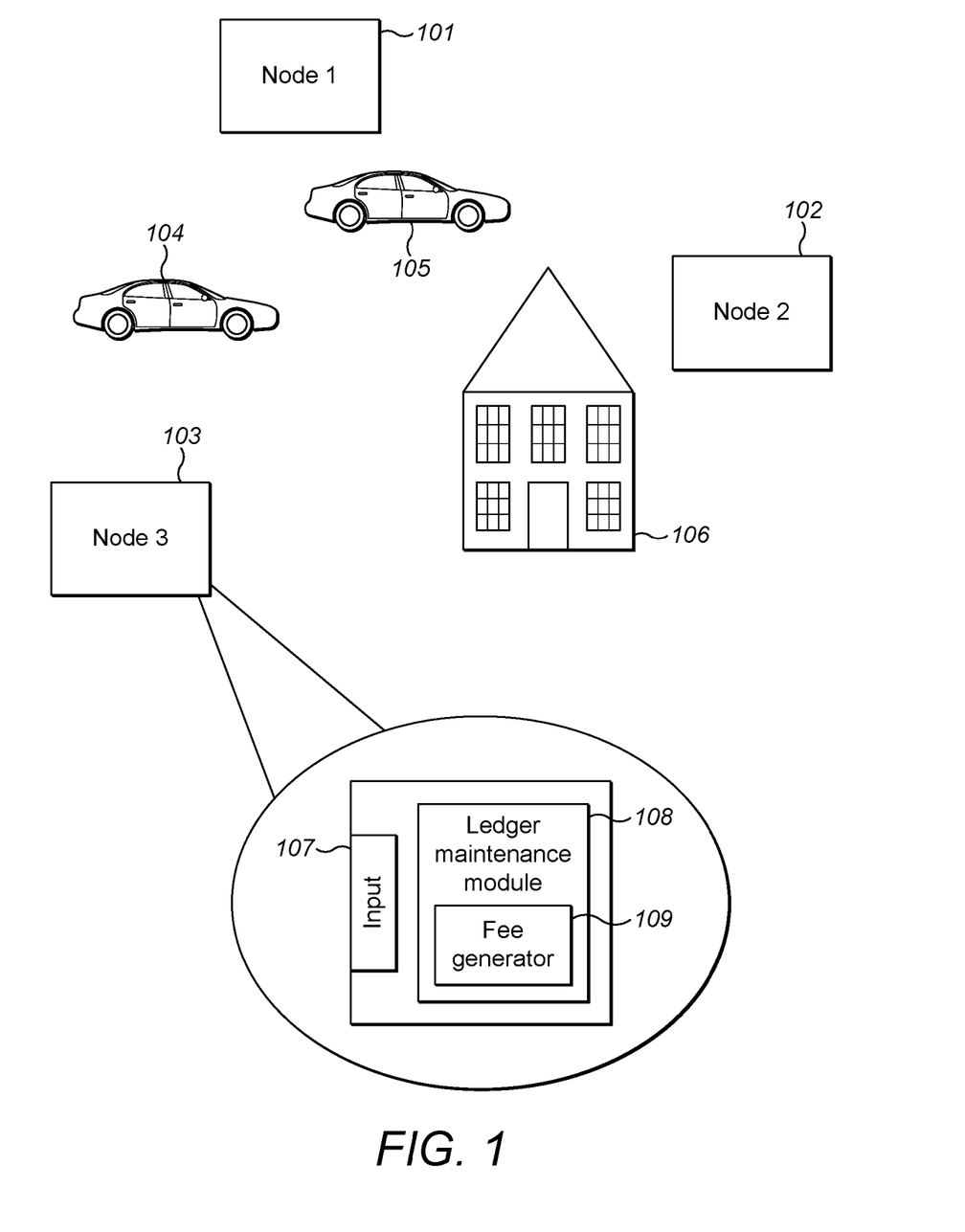
FIG. 1 shows an example of a system for implementing a shared usage scheme.

An example of a system for implementing a shared usage scheme is shown in FIG. 1. The system comprises a plurality of nodes, which are shown as computing devices 101 to 103. An individual node could be any computing device, i.e. a machine that can be instructed to automatically carry out calculations. Examples include servers, PCs, laptops, tablets, mobile phones etc. An individual node could also be "device" that is implemented via a distributed processing arrangement, such as the cloud. Any of these devices may include a user input mechanism, such as a keyboard or touchscreen, and an output mechanism, such as a display, in addition to a processing means such as a central processing unit (CPU). In one preferred arrangement, the nodes form a peer-to-peer network in which the devices exchange messages via either wired or wireless links to communicate and coordinate their actions.

The nodes are configured to interact to implement a distributed authentication protocol. The protocol is such that the devices cooperating in the protocol collectively authenticate blocks of data that are added to a corpus or chain of data. This is a consensus of replicated and synchronised data that is shared across the nodes. Each node may be configured to implement consensus algorithms to ensure replication of the data across the nodes. This arrangement does not require a central administrator. This arrangement will not usually require centralised storage, although centralised storage may be provided in some implementations to speed up interactions for users. Thus, the arrangement could include decentralised storage, storage in side chains or else centralised storage for optimisation and efficiency reasons.

The distributed authentication protocol may be a blockchain and/or distributed ledger protocol. New blocks that are to be added to the data corpus could be authenticated in response to them being from a trusted source. Alternatively, they could be authenticated through consensus protocols such as proof of work or proof of stake. In the event that there is disagreement between the participating nodes as to which is the authoritative version of the corpus or chain of data the protocol may be designed such that the majority view of the participating nodes, or the view associated with the most work, may prevail. The distributed authentication protocol could, for example, be or be based on Ethereum, Monax or Openchain. For convenience, the resulting data corpus will be referred to as a "blockchain" in the description below, but it should be understood that although the system may use a blockchain protocol it may also use a protocol other than a blockchain protocol.

The system also comprises one or more physical assets. In FIG. 1, a plurality of different physical assets 104 to 106 are shown. The assets could be any physical property that is capable of belonging to one or more owners. The owners could be individuals or organisations such as companies. In some implementations, the assets could be self-owning. It is envisaged that the physical assets are likely to be associated with high monetary value in most practical implementations, as such assets are most likely to be susceptible to rental and/or shared ownership. Examples include real estate, private and commercial aeroplanes and expensive and/or unusual sporting equipment (e.g. diving equipment). In one preferred example, the physical assets are vehicles, particularly cars.

One of the nodes of FIG. 1 is shown in more detail than the others to better illustrate how it facilitates shared usage of an asset. The node 103 comprises an input 107 that is configured to receive data that is indicative of use of one or more of the physical assets. That data may be received by the node directly from the asset or it may be received via an intermediary device. In many implementations, the use data may originate from one or more sensors that are attached to the asset. The data is typically transferred wirelessly from the asset, e.g. via an Internet of Things (IoT) communications protocol.

The node also comprises a ledger maintenance module 108. This module is configured to interact with the other nodes to implement the distributed authentication protocol. In one preferred example the nodes may interact to implement a blockchain protocol. Blockchain protocols provide for a distributed database comprising an ordered chain of data blocks. Each block links to the previous block in the chain and contains data to confirm the integrity of the previous block. In some examples, each block contains a time stamp. Each block may be linked to the previous block in the chain through including a hash of the previous block. In some blockchains the chain may be validated collectively by nodes that participate in the protocol. Data stored on the blockchain is generally considered to be incorruptible. Every node has a copy of the block chain. The need for a centralised administrator to preserve the authenticity of the database is therefore avoided.

The distributed authentication protocol is preferably configured to administer a scheme whereby the mobile assets can be shared between multiple users. The resulting blockchain may contain records which hold data that is to be memorialised. Examples of include user data and usage data. The blockchain may be referenced by a set of instructions for implementing a future transaction. Such a set of instructions is known as a smart contract. The smart contract will reference one or more file locations in the blockchain to process transactions.

Suitably the blockchain functions to record information relating to use of one or more of the physical assets. That information could include, for example:
  Who owns the physical asset;
  The proportion of the physical asset that belongs to different owners (for scenarios in which the asset is subject to shared ownership);
  Who is entitled to use the physical asset, for what purpose and when;
  Use data that records data indicative of how the asset has been used; and
  Usage fees allocated to owners in respect of use of the asset.

In one example, there may be an intermediate level of storage in which at least some real-time data of the system is stored. This intermediate storage may be a trusted database. The blockchain may indicate the database and/or the location of relevant information stored in it. In this implementation, nodes can query the blockchain for the latest information about a particular asset. The blockchain stores a record indicating the trusted database and/or location where the latest information on that asset is stored. Updates to information regarding the asset can be made in the database. The database's authority can be revoked by a new block being introduced to the blockchain which indicates a new trusted location for that asset. This approach has the advantage that it may be quicker for a user to access or change information about a particular asset. The database can be used as a temporary cache, and changes to the asset can be propagated in due course to the blockchain.

The node 103 also comprises a fee generator 109, which is configured to generate a usage fee in dependence on the use data. That usage fee is to be assigned to one or more owners of the physical asset. This is recorded in the blockchain by the ledger maintenance module 108. In some implementations, the fee generator could be implemented separately from the blockchain and configured to pass the usage fee to the ledger maintenance module. In other implementations, the fee generator could be implemented as part of the blockchain (as shown in FIG. 1). For example, the fee generator could be implemented by a smart contract that references file locations in the blockchain. The smart contract may be a computer protocol, implemented by the fee generator, that facilitates a contract between an owner of the asset and a user of the asset. For example, the protocol may dictate an algorithm that allocates one or more users a usage fee in return for the user being permitted to make use of the asset. The appropriate fee may be generated by the fee generator inputting the use data received by input 107 into the smart contract. It is expected that the usage fee will be generated in a cryptocurrency in many implementations, although any currency (including conventional currencies) could be used.

There are a number of different factors that the fee generator 109 may consider when determining a usage fee to assign to an owner of the asset. First, the usage fee itself has to be generated. The fee will depend on the terms of the contract between the owner(s) of the asset and the user. The contract will first establish conditions under which a user is permitted to use the asset. For example, a contract will establish that a person is entitled to use the asset. It may also set limits on that usage, e.g. that the asset may only be used at a particular time of day or within a particular geographical area. It will also establish how use of the asset is to be charged for. For example, the usage fee will often be dependent on a length of time that the asset was used for. Feedback from the asset itself, e.g. via one or more sensors fixed to the asset, may also enable the fee generator to implement more advanced charging mechanisms. For instance, sensor data may be used to predict that the use will have had a physical effect on the asset, e.g. that a driver may wear out the clutch more quickly because of his driving technique or a tenant may have encouraged damp by not using the central heating. Using this data to assess whether the use is likely to have damaged the asset may have two benefits: (i) it compensates the owner for increased maintenance costs and/or any detrimental impact that the use may have had on the value of the asset; and (ii) it may discourage unwanted behaviour from users.

A second factor that the fee generator 109 may consider when determining how much to assign a particular owner is the number of owners of the asset and their respective ownership shares. The ledger maintenance module 108 is preferably capable of dividing the usage fee between multiple owners. Where there are owners with different ownership shares (i.e. different owners own different proportions of the asset), the usage fee is suitably divided between those owners in proportion to their respective ownership shares. It should be noted that users may be non-owners or they may be owners. The mechanisms and systems described herein may therefore be used to implement rental schemes—in which non-owners pay to use the asset—and shared ownership schemes—in which users jointly own the asset but pay according to the amount of use they make of the asset—alike.

The node 103 may also use data that indicates how the asset has been used to trigger maintenance of the asset. This maintenance may involve third parties. Some use data may indicate that routine maintenance is required. For example, a vehicle may need to be serviced when it has travelled a predetermined distance. Some use data may indicate that exceptional maintenance is required. For example, a vehicle has suffered some impact and its body work requires attention. The blockchain may incorporate a smart contract that manages maintenance and will trigger action when the use data indicates that that is needed. Often maintenance will require a person to be dispatched to the asset. For example, a cleaner may be dispatched to an apartment. In other examples the asset may be able to initiate or manage its own maintenance. For example, self-driving vehicles may be able to drive themselves to a garage or petrol station.

Figure 2:
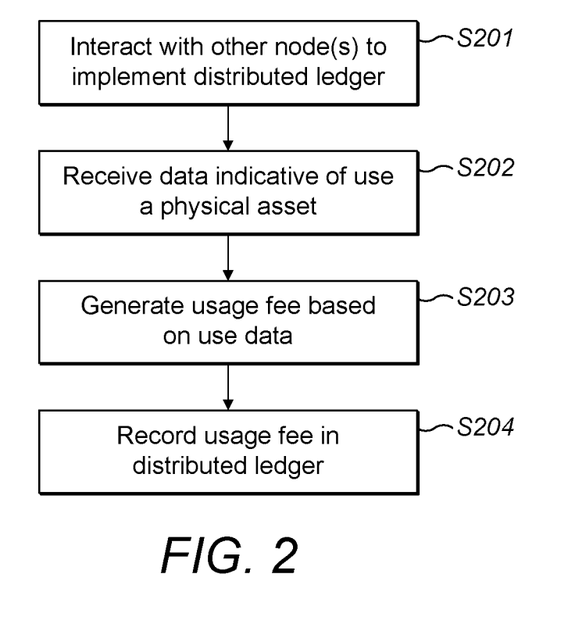
FIG. 2 shows an overview of a method for implementing a shared usage scheme.

A broad overview of a method that may be implemented by a node such as node 103 is shown in FIG. 2. The method commences in step S201 with the node interacting with one or more other nodes to implement a blockchain. The node receives data that is indicative of use of a physical asset (step S202) and generates a usage fee based on the use data (step S203). The node then record that usage fee in the blockchain (step S204).

The apparatus and methods described above may enable physical assets to be efficiently shared between large numbers of people. This provides an effective use of resources, enables shared ownership arrangements and provides asset owners with a means of generating revenue. Existing asset sharing schemes are usually administered by some central body, which can make it impractical for individuals to replicate the same model. The blockchain renders a central intermediary unnecessary, with the result that a shared ownership scheme is cheaper and easier for individuals to implement. The blockchain also removes any privacy concerns that might be associated with individuals' actions being monitored by a third party. This is because, even if a central intermediary is involved, each node has the same level of access to individuals' data as any other node, which helps generate trust between participants in the scheme and any intermediary. Finally, centralised databases can be vulnerable to hacking, whereas blockchains tend to be more robust due to the lack of a centralised point of vulnerability. Blockchains, in particular, are considered to be inherently resistant to modification of the data since data stored in a block cannot be altered retroactively.

The structures shown in FIG. 1 (and all the block apparatus diagrams included herein) are intended to correspond to a number of functional blocks. This is for illustrative purposes only. FIG. 1 is not intended to define a strict division between different parts of hardware on a chip or between different programs, procedures or functions in software. In some embodiments, some or all of the techniques described herein may be performed wholly or partly by a processor acting under software control. For example, the ledger maintenance module is likely to be a processor that is configured to implement the consensus algorithms that create the blockchain across the nodes. In some embodiments, some or all of the techniques described herein are likely to be performed wholly or partly in hardware. For example, the node's input may be a socket that is configured to receive incoming data.

An implementation will now be described that relates specifically to a car share scheme. This is for the purposes of example only; it should be understood that the systems and mechanisms described herein may be adapted to wide range of different applications. In particular, techniques that are described below with reference to a car share scheme are not limited to this particular implementation but may be applied more generally.

Figure 3:
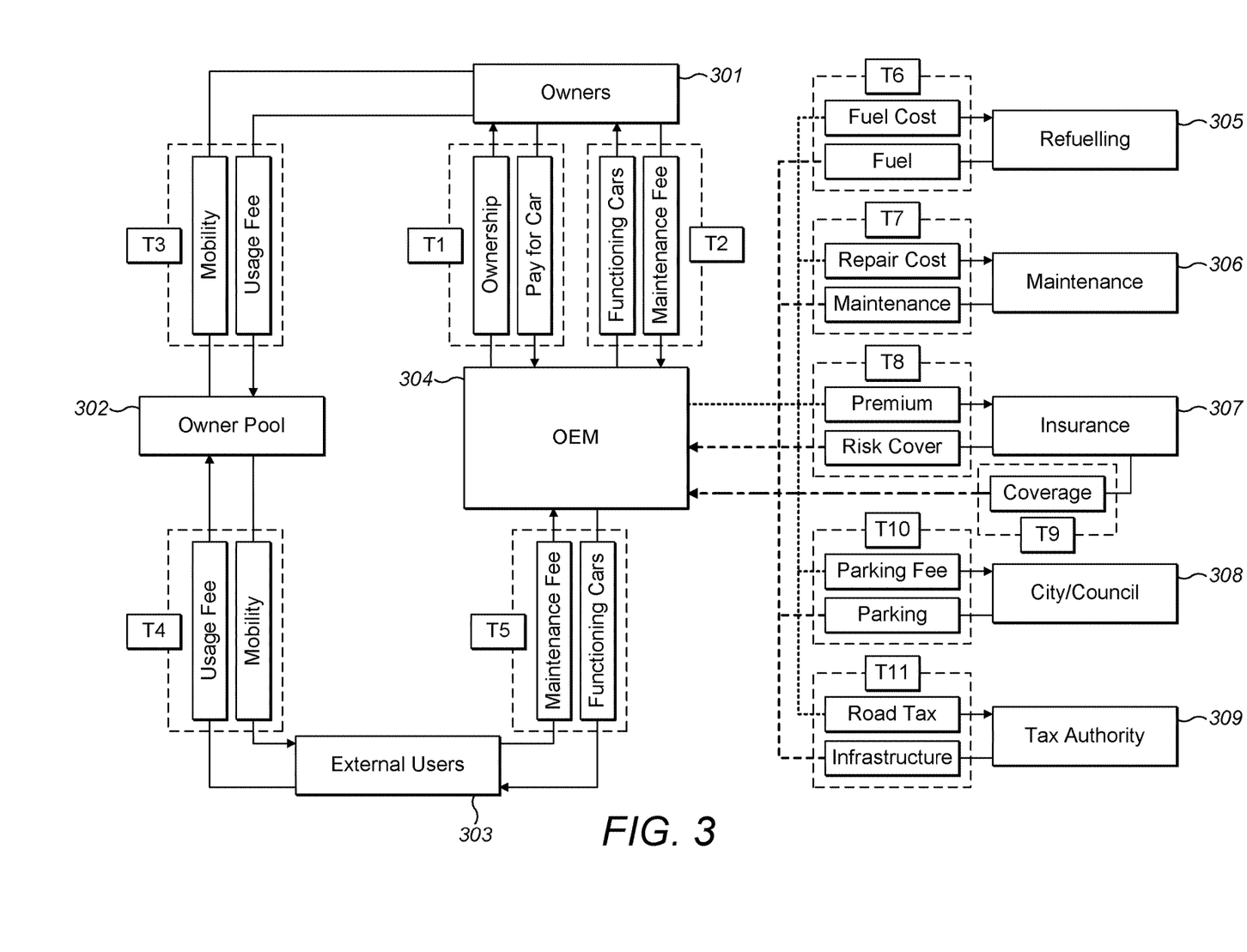
FIG. 3 shows an overview of a shared car ownership scheme.

FIG. 3 is a block diagram that gives an overview of a shared car ownership scheme. In this scheme owners (301) pay to gain part-ownership of a car fleet. Owners pay each other for drive time based on a usage algorithm. External users (i.e. non-owners, 303) can also pay owners to use the cars. In this example, the scheme is run by the OEM (original equipment manufacturer, 304). The OEM provides the cars initially and thereafter continues to maintain the cars and administer the shared ownership scheme in return for a management fee. The OEM also manages third party payments to external bodies such as garages and insurers (305-309). It may also manage and maintain a blockchain that is used to record all transactions that arise during administration of the scheme. Examples of transactions that are shown in FIG. 3 include:

T1: Owners (301) pay the OEM (304) in cryptocurrency to join an owner pool (302) and gain part of the ownership of a car fleet. Ownership may be symbolised by tokens. Each token may have a fixed cryptocurrency value. The number of tokens assigned to an owner compared with the total number of tokens indicates their proportional ownership of the car fleet.

T2: The OEM (304) provides the owners (301) with functioning cars in return for a management fee, which could be paid periodically (e.g. monthly) or per journey. The management fee may be paid in a cryptocurrency.

T3: Owners (301) have access to the cars, for which they pay a usage fee to the owner pool (302). The usage fee is distributed throughout the pool in accordance with the number of tokens assigned to each owner in the pool.

T4: External users also have access to the cars, for which they also pay a usage fee to the owner pool (302). Again, the usage fee is distributed throughout the pool in accordance with the number of tokens assigned to each owner in the pool. The relevant shares of the usage fee may be paid in a cryptocurrency.

T5: External users pay the OEM (304) a management fee and receive functioning cars in return. The management fee may be paid in a cryptocurrency.

T6-T11: the OEM manages payments to third party providers (probably via conventional currency) to maintain and support the car fleet.

For the OEM, the scheme shown in FIG. 3 removes cars from their balance sheet. It also realises a new revenue stream via management fees paid by the owners. For owners, they have access to cars that may be more expensive than those that they would otherwise be able to afford, since they only have to purchase a share of each car. They also have access to cars in a variety of different locations whenever they need them. For example, owners of a city-based car sharing scheme can have access to cars across the city.

The nodes that implement the scheme shown in FIG. 3 may be any computing platform that is capable of storing a copy of the blockchain that memorialises the transaction ledger and/or that is capable of executing logic in dependence on internal or external events and/or internally or externally defined rules. In one example, the nodes could be implemented by computers in a private network, e.g. a network owned/controlled by the OEM. In another example, they could be implemented by computers that are more widely distributed in an open network.

Figure 4:
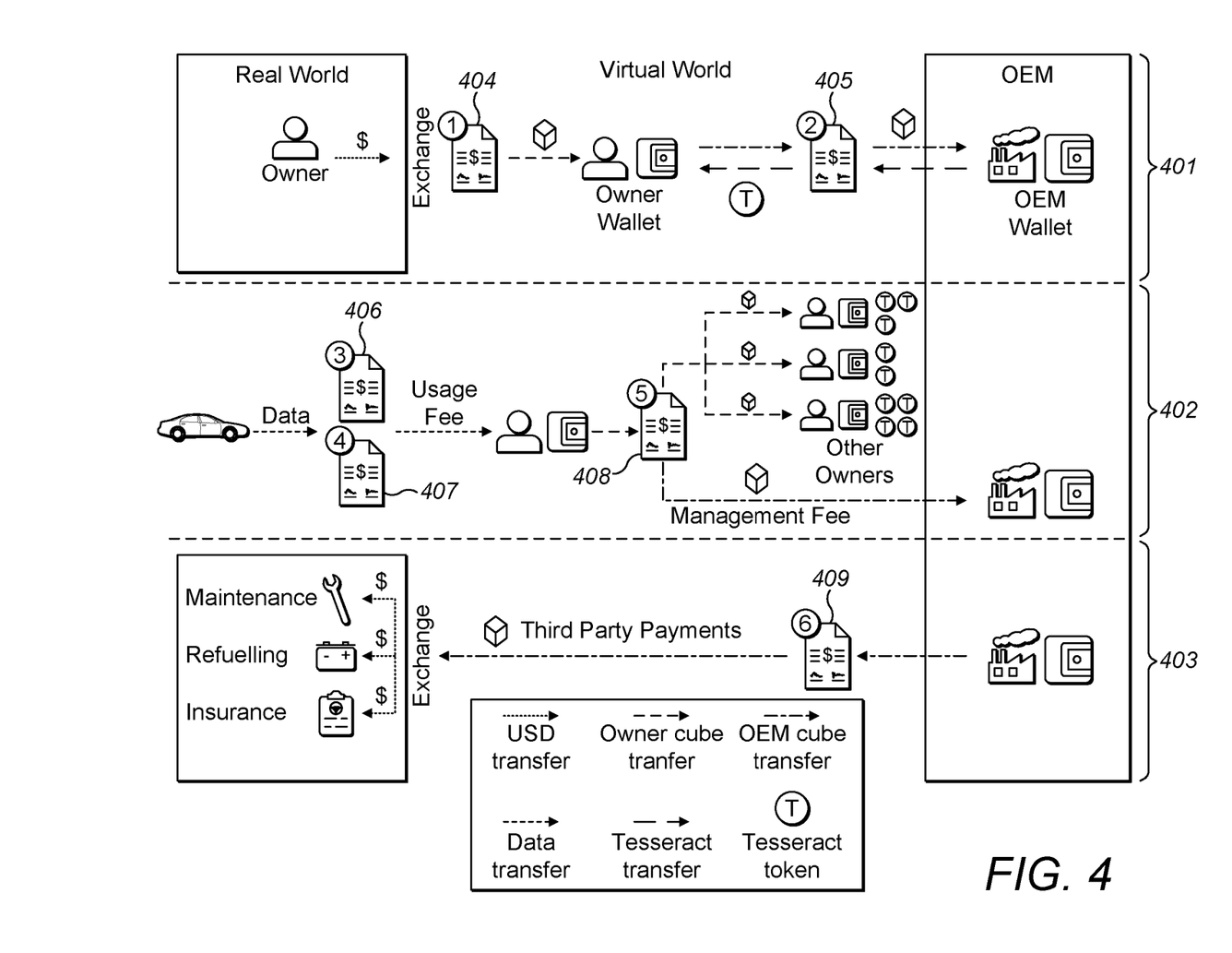
FIG. 4 shows examples of transactions that may be involved in implementing a shared car ownership scheme.

FIG. 4 shows examples of transactions that may be involved in implementing a car share scheme in more detail. These transactions can be divided into three categories:

The first category of transactions (401) facilitate owners and external users joining the scheme. This involves owners and external users purchasing cryptocurrency "cubes" on a currency exchange. Owners may also purchase tokens to signify their share of car ownership. Separate financing companies could provide funding for owners to buy tokens. These steps may involve the following smart contracts:

Contract 1: this contract (404) controls the issuance of cubes by creating cubes as units of a cryptocurrency, transacting conventional currency into cubes and moving cubes into owner/external user wallets.

Contract 2: this contract (405) controls the purchase of assets that denote percentage of ownership. These ownership shares may be recorded in an asset contract on the blockchain.

The second category of transactions (402) facilitate driving a car and paying for the journey. This involves data gathered by sensors on the car being input into a smart contract so that a "usage charge algorithm" can generate the usage fee. The driver is charged the usage fee, which is then automatically divided between owners depending on their respective number of tokens. Data relating to the journey can also be used to generate a per-journey management fee that can be included in the usage fee, but which is transferred to the OEM rather than the owners. These steps may involve the following smart contracts:

Contract 3: this contract (406) generates the owner part of the usage fee by inputting drive data from the car into a smart contract that uses the owner usage algorithm to calculate the owner part of the usage fee.

Contract 4: this contract (407) generates the OEM part of the usage fee by inputting drive data from the car into a smart contract that uses the external usage algorithm to calculate the OEM part of the usage fee.

Contract 5: this contract (408) transfers appropriate parts of the usage charge from the driver's wallet into owners' wallets and from the driver's wallet into the OEM wallet.

The third category of transactions (403) facilitate management of the scheme. The cars and schemes are maintained by the OEM, for which users pay the OEM a per journey or monthly management fee. This involves the OEM selling cubes derived from the management fee for conventional currency, which is then used to pay third parties for fuel, maintenance, insurance, parking and other running costs. These steps may involve the following smart contracts:

Contract 6: this contract (409) receives a breakdown of the management fee and makes automated, retrospective payment to third parties based on drive data from the car.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A system comprising:
one or more sensors fixed to a plurality of physical assets; and
at least two nodes, each node being a node computing device, each of the node computing devices being connected to a network, each of the node computing devices being configured to automatically execute instructions on node computing components:
an input component of the node computing device configured to receive data that is indicative of use of each of the physical assets, the received use data comprising data related to the physical asset and obtained via the one or more sensors;

a fee generator component of the node computing device configured to generate a usage fee for each of the physical assets, each usage fee being assigned to two or more owners of the physical asset based upon a number of tokens purchased by each of the two or more owners via an associated smart contract, each of the usage fees being generated in dependence on a combination of usage time of the physical asset and damage incurred on the physical asset during the usage time, as reflected in the received use data, each of the usage fees being automatically divisionally allocated amongst the two or more owners in dependence on the number of tokens associated with each of the two or more owners; and a ledger maintenance module that is a computing device, the ledger maintenance computing device being connected to the network and configured to that:

interact with one or more other of the at least two node computing devices to implement a distributed authentication protocol and to, at the ledger maintenance computing device being executed, record the generated and allocated usage fees in a data corpus authenticated by the distributed authentication protocol, and trigger maintenance of each of the assets in dependence on the use data, the two or more owners each of the assets being compensated for the maintenance based upon the divisional allocation of the usage fee to the two or more owners;

wherein the distributed authentication protocol is implemented by each of the at least two nodes cooperating to collectively authenticate the generated usage fees, the cooperating involving each of the at least two nodes, in parallel, replicating and synchronizing the generated and allocated usage fees across each of the at least two nodes without utilization of centralized storage.

2. The system as claimed in claim 1, wherein each of the at least two nodes is configured to cause the usage fee to be divided between the multiple owners in proportion to a division of ownership of the physical asset between those owners.

3. The system as claimed in claim 1, wherein each of the at least two nodes is configured to generate the usage fee by inputting the use data into a smart contract.

4. The system as claimed in claim 3, wherein the smart contract defines who can use the asset.

5. The system as claimed in claim 3, wherein the smart contract defines how the asset may be used.

6. The system as claimed in claim 1, wherein each of the at least two nodes is configured to receive use data that is indicative of use of the asset by a non-owner of the asset.

7. The system as claimed in claim 1, wherein each of the at least two nodes is configured to receive use data that is indicative of use of the asset by an owner of the asset.

8. The system as claimed in claim 1, wherein each of the at least two nodes is configured to generate the usage fee in a cryptocurrency.

9. The system as claimed in claim 1, wherein the distributed authentication protocol is a blockchain protocol.

10. A method performed at a system, the method comprising:

providing the system, comprising:
one or more sensors fixed to a plurality of physical assets;
at least two nodes, each of the at least two nodes being a computing device, each node computing device being connected to a network, each node computing device being configured to automatically execute instructions on computing device components; and
a ledge maintenance module that is a computing device, the ledger maintenance computing device being connected to the network;

receiving, for each of the plurality of physical assets and via an input component of one of the node computing devices, data that is indicative of use of each of the physical assets, the received use data comprising data related to each of the physical assets and obtained via the one or more sensors;

generating, for each of the plurality of physical assets and via a fee generator component of one of the node computing devices, a usage fee for each of the physical assets, each generated usage fee being assigned to two or more owners of the physical asset based upon a number of tokens purchased by each of the two or more owners via an associated smart contract, each of the usage fees being generated in dependence on a combination of usage time of the physical asset and damage incurred on the physical asset during the usage time, as reflected in the received use data, each of the usage fees being automatically divisionally allocated amongst the two or more owners in dependence on the number of tokens associated with each of the two or more owners;

interacting, for each of the plurality of physical assets and via the ledger maintenance computing device, with one or more other of the node computing devices to implement a distributed authentication protocol, the distributed authentication protocol being implemented by each of the at least two nodes cooperating to collectively authenticate the generated usage fee, the cooperating involving each of the at least two nodes, in parallel, independently replicating and synchronizing the generated and allocated usage fee across each of the at least two nodes without utilization of centralized storage;

triggering, for each of the plurality of physical assets and via the ledger maintenance computing device, maintenance of each of the assets in dependence on the use data, the two or more owners of each of the assets being compensated for the maintenance based upon the divisional allocation of the usage fee to the two or more owners; and recording, for each of the plurality of physical assets and via the ledger maintenance computing device, the generated and allocated usage fee in a distributed ledger authenticated by the distributed authentication protocol.

11. The system of claim 1, wherein the use data indicates that routine maintenance is required.

12. The system of claim 1, wherein the use data indicates that exceptional maintenance is required.

13. The system of claim 1, wherein each node computing device is configured to automatically execute instructions to initiate or manage the maintenance on the asset.

* * * * *

UNITED STATES PATENT AND TRADEMARK OFFICE
CERTIFICATE OF CORRECTION

PATENT NO.            : 12,169,827 B2                                    Page 1 of 1
APPLICATION NO.       : 16/634661
DATED                 : December 17, 2024
INVENTOR(S)           : John Simlett et al.

It is certified that error appears in the above-identified patent and that said Letters Patent is hereby corrected as shown below:

In the Claims

In Column 9, Lines 20-21, Claim 1, delete "configured to that:" and insert -- configured to: --, therefor.
In Column 10, Line 11, Claim 10, delete "a ledge" and insert -- a ledger --, therefor.
In Column 10, Line 62, Claim 13, delete "maintenance on" and insert -- maintenance of --, therefor.

Signed and Sealed this
Eleventh Day of March, 2025

Coke Morgan Stewart
*Acting Director of the United States Patent and Trademark Office*